United States Patent
Bailey, Jr.

(10) Patent No.: US 9,756,076 B2
(45) Date of Patent: Sep. 5, 2017

(54) DYNAMICALLY REACTING POLICIES AND PROTECTIONS FOR SECURING MOBILE FINANCIAL TRANSACTIONS

(75) Inventor: Samuel A. Bailey, Jr., Boca Raton, FL (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 659 days.

(21) Appl. No.: 12/640,289

(22) Filed: Dec. 17, 2009

(65) Prior Publication Data

US 2011/0154034 A1   Jun. 23, 2011

(51) Int. Cl.
*G06Q 20/00* (2012.01)
*H04L 29/06* (2006.01)
*G06Q 20/10* (2012.01)
*G06Q 40/02* (2012.01)
*H04W 12/08* (2009.01)

(52) U.S. Cl.
CPC ........... *H04L 63/20* (2013.01); *G06Q 20/108* (2013.01); *G06Q 40/02* (2013.01); *H04L 63/105* (2013.01); *H04W 12/08* (2013.01); *H04L 2463/102* (2013.01)

(58) Field of Classification Search
CPC .. H04L 63/20; H04L 2463/102; G06Q 20/108
USPC ........................................................ 705/64
See application file for complete search history.

(56) References Cited

U.S. PATENT DOCUMENTS

| | | | |
|---|---|---|---|
| 4,796,025 A | 1/1989 | Farley et al. | |
| 5,053,956 A | 10/1991 | Donald et al. | |
| 5,784,566 A | 7/1998 | Viavant et al. | 395/200.59 |
| 5,796,942 A | 8/1998 | Esbensen | |
| 6,088,450 A | 7/2000 | Davis et al. | |
| 6,321,338 B1 | 11/2001 | Porras et al. | |
| 6,330,546 B1 | 12/2001 | Gopinathan et al. | |

(Continued)

FOREIGN PATENT DOCUMENTS

| | | |
|---|---|---|
| CN | 1269030 | 10/2000 |
| CN | 101189859 | 5/2008 |

(Continued)

OTHER PUBLICATIONS

Paquet, Catherine. Network Security Concepts and Policies—Sample Chapter is provided courtesy of Cisco Press. Feb. 5, 2013. http://www.ciscopress.com/articles/article.asp?p=1998559. Retrieved online Jun. 17, 2017.*

(Continued)

*Primary Examiner* — James A Reagan
(74) *Attorney, Agent, or Firm* — Snell & Wilmer L.L.P.

(57) ABSTRACT

A secure mobile financial transaction is provided by receiving a list of protection methods from an external terminal over a communication network. A matrix of protection methods corresponding to the external terminal is created based on the identified protection methods. Security-related information is received from one or more trust mediator agents over the communication network. Rules corresponding to the received security related information are retrieved, and at least one protection method is selected from the matrix of protection methods based on the retrieved rules. The selected protection method is transmitted to the trust mediator agents for implementation.

18 Claims, 7 Drawing Sheets

(56) References Cited

U.S. PATENT DOCUMENTS

| | | | |
|---|---|---|---|
| 6,484,182 B1 | 11/2002 | Dunphy et al. | |
| 6,530,024 B1 | 3/2003 | Proctor | |
| 6,590,580 B2 | 7/2003 | Horikawa et al. | |
| 6,611,863 B1* | 8/2003 | Banginwar | H04L 41/12 709/203 |
| 6,681,249 B2 | 1/2004 | Christensen et al. | |
| 6,744,780 B1 | 6/2004 | Gu et al. | |
| 6,961,858 B2 | 11/2005 | Fransdonk | |
| 6,965,294 B1 | 11/2005 | Elliott et al. | |
| 7,020,635 B2 | 3/2006 | Hamilton et al. | |
| 7,058,968 B2 | 6/2006 | Rowland et al. | |
| 7,080,049 B2 | 7/2006 | Truitt et al. | |
| 7,090,128 B2 | 8/2006 | Farley et al. | |
| 7,095,850 B1 | 8/2006 | McGrew | |
| 7,107,462 B2 | 9/2006 | Fransdonk | |
| 7,150,045 B2 | 12/2006 | Koelle et al. | |
| 7,152,242 B2 | 12/2006 | Douglas | |
| 7,174,462 B2 | 2/2007 | Pering et al. | |
| 7,260,844 B1 | 8/2007 | Tidwell et al. | |
| 7,305,709 B1 | 12/2007 | Lymer et al. | |
| 7,565,693 B2 | 7/2009 | Shin et al. | |
| 7,587,502 B2 | 9/2009 | Crawford et al. | |
| 7,660,795 B2 | 2/2010 | Barrett et al. | |
| 7,685,254 B2 | 3/2010 | Pandya | |
| 7,711,586 B2 | 5/2010 | Aggarwal et al. | |
| 7,835,721 B2 | 11/2010 | Tuulos et al. | |
| 7,895,649 B1 | 2/2011 | Brook et al. | |
| 7,921,205 B2 | 4/2011 | Shen et al. | |
| 7,937,353 B2 | 5/2011 | Bernoth et al. | |
| 8,001,054 B1 | 8/2011 | Peart et al. | |
| 8,074,282 B1 | 12/2011 | Lymer et al. | |
| 8,087,085 B2 | 12/2011 | Hu et al. | |
| 8,117,458 B2 | 2/2012 | Osborn, III et al. | |
| 8,146,160 B2 | 3/2012 | Orr et al. | |
| 8,272,061 B1 | 9/2012 | Lotem et al. | |
| 8,406,119 B2 | 3/2013 | Taylor et al. | |
| 8,621,636 B2 | 12/2013 | Bailey | |
| 8,639,629 B1 | 1/2014 | Hoffman | |
| 8,650,129 B2 | 2/2014 | Bailey | |
| 8,752,142 B2 | 6/2014 | Bailey | |
| 8,850,539 B2 | 9/2014 | Bailey | |
| 8,924,296 B2 | 12/2014 | Bailey | |
| 8,955,140 B2 | 2/2015 | Bailey | |
| 8,959,568 B2* | 2/2015 | Hudis | G06F 21/552 726/1 |
| 9,027,120 B1 | 5/2015 | Tidwell et al. | |
| 9,213,975 B2 | 12/2015 | Bailey | |
| 9,292,695 B1 | 3/2016 | Bassett | |
| 2002/0129145 A1 | 9/2002 | Chow | |
| 2002/0194096 A1 | 12/2002 | Falcone et al. | |
| 2002/0194119 A1 | 12/2002 | Wright et al. | |
| 2003/0076959 A1* | 4/2003 | Chui | H04K 1/00 380/277 |
| 2003/0110392 A1 | 6/2003 | Aucsmith et al. | |
| 2003/0145226 A1 | 7/2003 | Bruton, III et al. | |
| 2004/0015719 A1 | 1/2004 | Lee et al. | |
| 2004/0030927 A1 | 2/2004 | Zuk | |
| 2004/0049698 A1 | 3/2004 | Ott et al. | |
| 2004/0187034 A1 | 9/2004 | Tamura et al. | |
| 2005/0010768 A1 | 1/2005 | Light et al. | |
| 2005/0091527 A1 | 4/2005 | Swander et al. | 713/201 |
| 2005/0125360 A1 | 6/2005 | Tidwell et al. | |
| 2005/0164675 A1 | 7/2005 | Tuulos et al. | |
| 2005/0182969 A1 | 8/2005 | Ginter et al. | |
| 2005/0201561 A1 | 9/2005 | Komano et al. | |
| 2006/0085839 A1 | 4/2006 | Brandt et al. | 726/2 |
| 2006/0090198 A1* | 4/2006 | Aaron | H04L 63/105 726/6 |
| 2006/0161435 A1 | 7/2006 | Atef et al. | |
| 2006/0200427 A1 | 9/2006 | Morrison et al. | 705/67 |
| 2006/0200666 A1 | 9/2006 | Bailey, Jr. | 713/168 |
| 2006/0225132 A1 | 10/2006 | Swift et al. | 726/11 |
| 2006/0265739 A1* | 11/2006 | Bhaskaran | H04L 41/0803 726/4 |
| 2006/0276173 A1 | 12/2006 | Srey et al. | |
| 2006/0291447 A1 | 12/2006 | Siliquini et al. | |
| 2007/0016955 A1 | 1/2007 | Goldberg et al. | 726/25 |
| 2007/0036314 A1 | 2/2007 | Kloberdans et al. | |
| 2007/0101432 A1 | 5/2007 | Carpenter | |
| 2007/0143832 A1 | 6/2007 | Perrella et al. | 726/5 |
| 2007/0234412 A1 | 10/2007 | Smith et al. | 726/11 |
| 2007/0250709 A1 | 10/2007 | Bailey, Jr. | 713/168 |
| 2008/0082380 A1 | 4/2008 | Stephenson | |
| 2008/0086759 A1 | 4/2008 | Colson | |
| 2008/0098464 A1 | 4/2008 | Mizrah | |
| 2008/0104700 A1 | 5/2008 | Fagone et al. | |
| 2008/0120707 A1 | 5/2008 | Ramia | |
| 2008/0178294 A1 | 7/2008 | Hu et al. | |
| 2008/0262990 A1* | 10/2008 | Kapoor | G06F 9/505 706/20 |
| 2008/0270579 A1 | 10/2008 | Herz et al. | 709/219 |
| 2008/0307487 A1 | 12/2008 | Choyi et al. | |
| 2009/0025084 A1 | 1/2009 | Siourthas et al. | |
| 2009/0044279 A1 | 2/2009 | Crawford et al. | |
| 2009/0112761 A1 | 4/2009 | Hammad | |
| 2009/0125977 A1 | 5/2009 | Chander et al. | |
| 2009/0158425 A1 | 6/2009 | Chan et al. | 726/21 |
| 2009/0165125 A1 | 6/2009 | Brown et al. | |
| 2009/0216910 A1 | 8/2009 | Duchesneau | |
| 2009/0222907 A1 | 9/2009 | Guichard | |
| 2009/0271844 A1 | 10/2009 | Zhang et al. | 726/2 |
| 2009/0292568 A1 | 11/2009 | Khosravani et al. | |
| 2009/0300716 A1 | 12/2009 | Ahn | 726/1 |
| 2009/0328219 A1 | 12/2009 | Narayanaswamy | |
| 2010/0010874 A1 | 1/2010 | Howard et al. | |
| 2010/0082513 A1 | 4/2010 | Liu | |
| 2010/0094767 A1 | 4/2010 | Miltonberger | |
| 2010/0251388 A1 | 9/2010 | Dorfman | |
| 2010/0275010 A1 | 10/2010 | Ghirardi | |
| 2010/0293090 A1 | 11/2010 | Domenickos et al. | |
| 2010/0294927 A1 | 11/2010 | Nelson et al. | |
| 2011/0016513 A1 | 1/2011 | Bailey | |
| 2011/0154497 A1 | 6/2011 | Bailey | |
| 2011/0178933 A1 | 7/2011 | Bailey | |
| 2011/0252479 A1 | 10/2011 | Beresnevichiene et al. | |
| 2011/0313925 A1 | 12/2011 | Bailey | |
| 2011/0313930 A1 | 12/2011 | Bailey | |
| 2011/0314529 A1 | 12/2011 | Bailey | |
| 2014/0156515 A1 | 6/2014 | Bailey | |
| 2014/0379581 A1 | 12/2014 | Bailey | |
| 2015/0012979 A1 | 1/2015 | Bailey | |
| 2015/0161611 A1 | 6/2015 | Duke | |

FOREIGN PATENT DOCUMENTS

| | | | |
|---|---|---|---|
| CN | 101300566 | 11/2008 | |
| GB | 2456742 A * | 7/2009 | G06F 21/57 |
| JP | 2004078539 A | 3/2004 | |
| JP | 2004280724 | 10/2004 | |
| JP | 2009110334 | 5/2009 | |
| JP | 2009523275 | 6/2009 | |
| JP | 2011517859 | 6/2011 | |
| WO | 2009021070 | 2/2009 | |

OTHER PUBLICATIONS

Selim Aissi et al., "Security for Mobile Networks and Platforms", Artech House Publishers (2006), 329 pages.
Zhigun Chen, "Java Card Technology for Smart Cards: Architecture and Programmers Guide", Prentice Hall (2000), pp. 57-63.
Clayton M. Christensen and Michael E. Raynor, "The Innovators Solution: Creating and Sustaining Successful Growth" Harvard Business Press (2003), pp. 31-71.
Edward T. Dowling, "Mathematical Methods for Business and Economics", McGraw-Hill (2009), pp. 89-127 and 177-196.
Robert Gibbons, "Game Theory for Applied Economists", Princeton University Press (1992), pp. 29-48 and 173-255.
Charles W. L. Hill and Gareth R. Jones, "Strategic Management Theory: An Integrated Approach", South-Western College Pub, 9th edition (2009), pp. 208-241.

(56) References Cited

OTHER PUBLICATIONS

Michael Howard and David Leblanc, "Writing Secure Code, Practical Strategies and Techniques for Secure Application Coding in a Networked World", Microsoft Press, 2nd ed. (2003), pp. 69-124, 259-298, and 455-476.
Ronald L. Krutz and Russell Dean Vines, "The CISSP Prep Guide, Mastering the Ten Domains of Computer Security", Wiley (2001), pp. 183-213.
Peter Morris, "Introduction to Game Theory", Springer Verlag New York, Inc. (1994), pp. 65-97.
Winn Schwartau, "Time Based Security", Interpact Press (1999), pp. 33-36, 65-74, and 121-125.
Shreeraj Shah, "Hacking Web Services", Charles River Media (2006), pp. 171-221, 271-298.
Fred B. Wrixon, "Codes Ciphers & Other Cryptic and Clandestine Communications, Making and Breaking Secret Messages from Hieroglyphs to the Internet", Black DogLrvrnthal Pub. (1998), pp. 298-309.
Colin English et al., "Dynamic Trust Models for Ubiquitous Computing Environments", University of Strathclyde, Glasgow, Scotland, Department of Computer and Information Sciences (2002).
Graham Messick, "Cyber War: Sabotaging the System" (Nov. 8, 2009), CBS Interactive Inc., http://www.cbsnews.com/stories/2009/11/06/60minutes/main5555565.shtml?tag=currentVideoInfo;segmentUtilities.
Peng Ning and Sushil Jajodia, "Intrusion Detection Techniques", http://discovery.csc.ncsu.edu/Courses/csc774-S03/IDTechniques.pdf (last visited Sep. 24, 2010).
Brian Wotring, "Host Integrity Monitoring: Best Practices for Deployment" (Mar. 31, 2004), http://www.symantec.com/connect/articles/host-integrity-monitoring-best-practices-deployment.
Office Action dated Oct. 7, 2014 in U.S. Appl. No. 14/139,840.
Office Action dated Jan. 9, 2015 in U.S. Appl. No. 14/480,169.
Final Office Action dated Apr. 23, 2015 in U.S. Appl. No. 14/480,169.
Office Action dated Apr. 29, 2015 in U.S. Appl. No. 14/492,771.
Office Action dated Jun. 4, 2015 in Canadian Application No. 2,767,862.
Advisory Action dated Aug. 5, 2015 in U.S. Appl. No. 14/480,169.
Notice of Allowance dated Aug. 12, 2015 in U.S. Appl. No. 14/492,771.
Office Action dated Nov. 2, 2015 in U.S. Appl. No. 14/252,276.
Office Action dated Feb. 1, 2016 in U.S. Appl. No. 14/480,169.
Office Action dated Apr. 7, 2016 in U.S. Appl. No. 12/820,190.
Notice of Allowance dated Feb. 24, 2016 in U.S. Appl. No. 14/252,276.
Final Office Action dated Nov. 3, 2016 in U.S. Appl. No. 12/820,190.
Final Office Action dated Sep. 29, 2016 in U.S. Appl. No. 14/599,151.
Notice of Allowance dated Oct. 13, 2016 in U.S. Appl. No. 14/175,475.
Extended European Search Report dated Jul. 22, 2016 in European Application No. 10800510.9.
International Search Report and Written Opinion dated Feb. 2, 2011 in Application No. PCT/US2010/059883.
International Search Report and Written Opinion dated Feb. 2, 2011 in Application No. PCT/US2010/059887.
International Search Report and Written Opinion dated Feb. 11, 2011 in Application No. PCT/US2010/059889.
Office Action dated Aug. 5, 2011 in U.S. Appl. No. 12/820,190.
International Search Report and Written Opinion dated Nov. 15, 2010 in Application No. PCT/US2010/042043.
International Search Report and Written Opinion dated Nov. 14, 2011 in Application No. PCT/US2011/041147.
Office Action dated Dec. 9, 2011 in U.S. Appl. No. 12/820,186.
International Preliminary Report on Patentability dated Jan. 17, 2012 in Application No. PCT/US2010/042043.
Office Action dated Feb. 28, 2013 in Mexican Application No. MX/A/2012/000606.
Office Action dated Jan. 20, 2012 in U.S. Appl. No. 12/504,828.
Final Office Action dated Feb. 10, 2012 in U.S. Appl. No. 12/820,190.
Final Office Action dated Mar. 29, 2012 in U.S. Appl. No. 12/820,186.
Office Action dated Mar. 30, 2012 in U.S. Appl. No. 12/640,183.
Office Action dated Jun. 16, 2016 in U.S. Appl. No. 14/175,475.
Advisory Acton dated Jun. 6, 2012 in U.S. Appl. No. 12/820,190.
International Preliminary Report on Patentability dated Jun. 19, 2012 in Application No. PCT/US2010/059887.
International Preliminary Report on Patentability dated Jun. 19, 2012 in Application No. PCT/US2010/059883.
Office Action dated Jun. 15, 2016 in U.S. Appl. No. 14/599,151.
Final Office Action dated Jul. 2, 2012 in U.S. Appl. No. 12/504,828.
Advisory Action dated Jul. 10, 2012 in U.S. Appl. No. 12/820,186.
Office Action dated Jul. 18, 2012 in U.S. Appl. No. 12/820,190.
International Preliminary Report on Patentability dated Jul. 24, 2012 in Application No. PCT/US2010/059889.
Office Action dated Aug. 28, 2012 in U.S. Appl. No. 12/820,186.
Office Action dated Sep. 4, 2012 in U.S. Appl. No. 12/690,461.
Office Action dated Sep. 4, 2012 in U.S. Appl. No. 12/820,193.
Final Office Action dated Oct. 11, 2012 in U.S. Appl. No. 12/640,183.
Advisory Action dated Oct. 11, 2012 in U.S. Appl. No. 12/504,828.
Final Office Action dated Dec. 19, 2012 in U.S. Appl. No. 12/820,186.
Notice of Allowance dated Dec. 26, 2012 in U.S. Appl. No. 12/690,461.
International Preliminary Report on Patentability dated Dec. 28, 2012 in Application No. PCt/US2011/041147.
Advisory Action dated Jan. 16, 2013 in U.S. Appl. No. 12/640,183.
Final Office Action dated Mar. 5, 2013 in U.S. Appl. No. 12/820,193.
Office Action dated Mar. 28, 2013 in U.S. Appl. No. 12/640,183.
Advisory Action dated May 29, 2013 in U.S. Appl. No. 12/820,193.
Office Action dated Jun. 24, 2013 in U.S. Appl. No. 12/504,828.
Office Action dated Jul. 15, 2013 in U.S. Appl. No. 12/820,193.
Notice of Allowance dated Aug. 21, 2013 in U.S. Appl. No. 12/640,183.
Office Action in Mexican Application No. MX/A/2012/000606.
Notice of Allowance dated May 27, 2016 in Canadian Application No. 2,767,862.
Office Action dated Oct. 2, 2013 in U.S. Appl. No. 12/820,186.
Notice of Allowance dated Oct. 7, 2013 in U.S. Appl. No. 12/690,461.
Final Office Action dated Oct. 23, 2013 in U.S. Appl. No. 12/820,190.
Notice of Allowance dated Dec. 2, 2013 in U.S. Appl. No. 12/504,828.
Office Action dated Jan. 24, 2014 in Japanese Application No. 2012-520759.
Final Office Action dated Jan. 28, 2014 in U.S. Appl. No. 12/820,193.
Office Action dated Mar. 3, 2014 in Chinese Application No. 201080029478.7.
Notice of Allowance dated May 5, 2014 in U.S. Appl. No. 12/820,186.
Corrected Notice of Allowability dated May 8, 2014 in U.S. Appl. No. 12/504,828.
Notice of Allowance dated May 22, 2014 in U.S. Appl. No. 12/820,193.
Notice of Allowance dated Feb. 23, 2017 in U.S. Appl. No. 15/166,673.
U.S. Appl. No. 15/337,246, filed Oct. 28, 2016 entitled "Selectable Encryption Methods".
Advisory Action dated Dec. 27, 2016 in U.S. Appl. No. 14/599,151.
Advisory Action dated Jan. 11, 2017 in U.S. Appl. No. 12/820,190.
Office Action dated Jan. 17, 2017 in U.S. Appl. No. 14/599,151.

* cited by examiner

DYNAMICALLY REACTING POLICIES AND PROTECTIONS FOR SECURING MOBILE FINANCIAL TRANSACTIONS

BACKGROUND OF THE INVENTION

Field of the Invention

The present invention generally relates to information security systems, and more particularly, to dynamically reacting policies and protections for securing mobile financial transactions.

Related Art

With the proliferation of mobile communication devices, such as mobile telephones, financial account holders that have such devices have begun to use them to complete financial transactions. Enabling financial account holders to do so, however, poses unique security risks for financial account issuers, particularly because security capabilities and risks vary widely across different mobile communication devices and different mobile communication networks. For example, typical payment systems involve point-of-sale (POS) terminals that are usually owned and designed by either financial transaction issuers or merchants. In contrast, because mobile communication devices are manufactured by various manufacturers and can be modified by third parties, financial account issuers have less control and knowledge of the security capabilities and risks associated with them. This makes it more difficult to control the security of financial transactions that are completed using mobile communication devices. Security measures vary based on particular models of mobile communication devices, thus compounding this inherent security risk.

The risk for financial account issuers is further complicated by the mobility of mobile communication devices. Each location in which mobile communication devices can be operated potentially has a different security environment. As a result, different security measures for each location are necessary. For example, bringing a mobile communication device into a foreign country may require the mobile communication device to roam on a foreign mobile communication network, which has inherently different security risks, capabilities, and other characteristics.

Security designers perform a labor-intensive and exhaustive analysis of the risks associated with each component of a new network in an attempt to safely interface their existing security system with the new network. The existing security system is often modified to accommodate the risks associated with the new network. This process takes a substantial amount of time and thus limits the speed with which financial account issuers can enter new markets that utilize mobile-based financial transaction networks. As a consequence, they can lose market share.

In addition, security designers typically assume that all security characteristics and risks of the network components will remain static once the system is deployed. A typical security system thus utilizes a particular set of security measures deployed until the security system is taken offline and either replaced or modified. In other words, if risks of the security system change, for example, by a breach of a security measure by an attacker, a maintenance window or an outage must be realized to enable the security system to be modified to respond to a security breach, patch, or upgrade. Such a system cannot adapt dynamically to various detected feedback relating to changes impacting the security situation of the network. Typical security systems, therefore, lack the adaptability necessary to be suitable for mobile-based financial transaction systems. Moreover, the static security measures of typical security systems increase the ease with which internal and external attackers can circumvent the security measures. As payment and network systems adapt to next generation payment and communication, the attacks and exploits will also evolve into next generation criminal exploits.

Notwithstanding the above-mentioned security risks, enabling mobile transactions is still a particularly attractive means for financial account issuers to enter the markets of non-bankable countries where widespread POS infrastructure is neither available nor practical.

Given the foregoing, it would be useful to be able to continuously detect changes in network security characteristics, and adapt based on these detected changes to maintain an acceptable level of security for existing and new network connections including merchants, customers, and partners for visiting and home networks.

It also would be useful to enable business entities, such as financial account issuers, to enter new markets (e.g., the mobile-based financial transaction market) with minimal modifications to their existing security system, and to accept new risk scenarios with the ability to manage magnitude of exposure by network segment, region, issuer, partner, device, and/or account across numerous device and network types.

In addition, it would be useful to enable the characterization of currently uncharacterized (e.g., non-domestic) communication network components and/or attributes to enable adaptation to the risks to maintain an acceptable level of security.

BRIEF DESCRIPTION OF THE INVENTION

The present invention meets the above-identified needs by providing systems, methods, and computer program products for securing mobile financial transactions over a communication network.

Trust mediator agents, which are associated with each network component, continuously detect changes in the security characteristics of each network component using sensors and feed the detected changes back to a trust mediator. The trust mediator uses the feedback from the trust mediator agents to determine whether and how to modify currently running security safeguards in order to maintain an appropriate level of security. Modifications, if any, are communicated by the trust mediator to the appropriate network component via its associated trust mediator agent for implementation. The process is recursive and thus continuously adapts to changes in network security characteristics as they arise over time to strike a balance between the probability of loss plus magnitude of loss versus acceptable risk to enable business transactions to continue without disruption at an account level and/or at a network component level.

A business entity (e.g., a financial account issuer) can integrate new communication networks having new security characteristics into their existing network without the need to perform an exhaustive and labor-intensive upfront analysis to estimate the security impact a new communication network will have on their existing network. Instead, the business entity can define rules, such as a threshold of acceptable risk, begin to communicate with the new network, and enable their existing security system to detect and adapt to the security characteristics of the new network while maintaining the acceptable risk acceptance level. Time-to-market is reduced, and the level of risk exposed to the business entity can be managed at a minimized level.

Users' expectations regarding security measures are taken into account. Thus, if a particular security measure is too inconvenient for a user, the security measure is modified or disabled to a minimal level. This balances the risk acceptance of a firm with a convenience cost representing user or account holder countermeasure choice, and provides the issuer and the account holder with firm acceptable transaction risk elasticity. Alternatively, if the security measure provides too low a security level for the user to accept the security measure, it is modified or replaced with a more rigorous security measure. The effect is to increase the propensity for user satisfaction and thus movement towards equilibrium of strategy and payoff for usage of the system based on time, location, and relevance, and results in more efficient risk models to increase market share for the business entity.

In one embodiment, a processor coupled to a memory receives a list of protection methods from an external terminal over a communication network. The processor creates a matrix of protection methods corresponding to the external terminal based on the identified protection methods. Security-related information is received from one or more trust mediator agents over the communication network. The processor retrieves, from a master list of rules, rules corresponding to the received security related information, and selects at least one protection method from the matrix of protection methods based on the retrieved rules. The processor transmits the selected protection method to the trust mediator agents for implementation.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when taken in conjunction with the following drawings.

DETAILED DESCRIPTION

Figure 1:
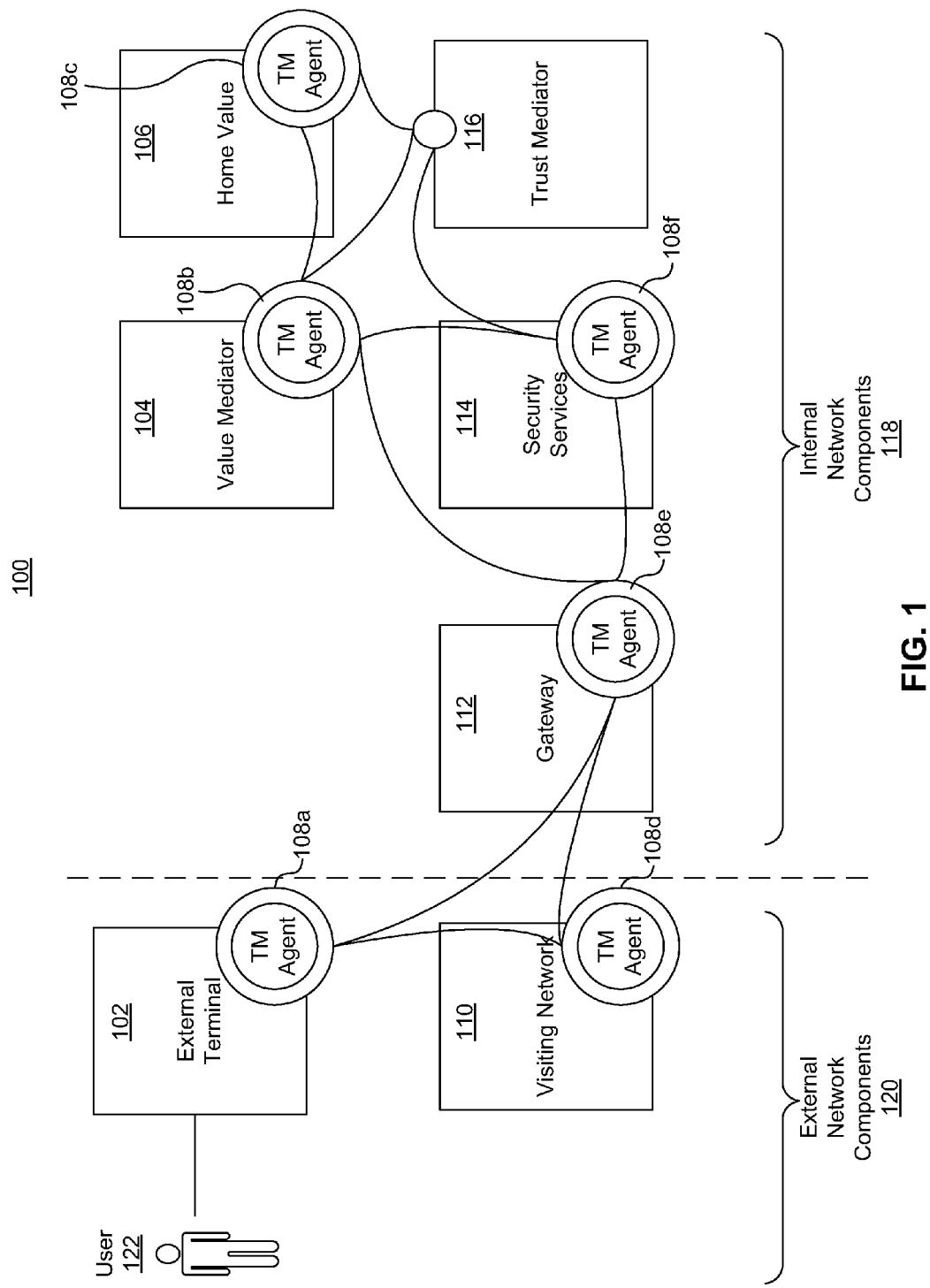
FIG. 1 is a diagram of an exemplary security system for adaptively securing mobile communication device transactions in accordance with an embodiment of the present invention.

The present invention is directed to dynamically reacting policies and protections for securing mobile financial transactions, which are now described in more detail herein in terms of an example mobile payment system. This is for convenience only and is not intended to limit the application of the present invention. In fact, after reading the following description, it will be apparent to one skilled in the relevant art(s) how to implement the following invention in alternative embodiments (e.g., general network security systems, mass transit security systems, home and business security systems, etc.).

The terms "user," "consumer," "account holder," and/or the plural form of these terms are used interchangeably throughout herein to refer to those persons or entities capable of accessing, using, being affected by and/or benefiting from the present invention.

A "merchant" as used herein refers to any person, entity, distributor system, software and/or hardware that is a provider, broker and/or any other entity in the distribution chain of goods or services. For example, a merchant can be a grocery store, a retail store, a travel agency, a service provider, an online merchant or the like.

A "transaction account" as used herein refers to an account associated with an open account or a closed account system. The transaction account can exist in a physical or non-physical embodiment. For example, a transaction account can be distributed in non-physical embodiments such as an account number, frequent-flyer account, telephone calling account or the like. Furthermore, a physical embodiment of a transaction account can be distributed as a financial instrument.

An "account," "account number," or "account code," as used herein, can include any device, code, number, letter, symbol, digital certificate, smart chip, digital signal, analog signal, biometric or other identifier/indicia suitably configured to allow a consumer to access, interact with or communicate with a financial transaction system. The account number can optionally be located on or associated with any financial transaction instrument (e.g., a rewards, charge, credit, debit, prepaid, telephone, embossed, smart, magnetic stripe, bar code, transponder or radio frequency card).

The terms "financial account issuer," "account issuer," and "issuer," and/or the plural forms of these terms are used interchangeably throughout herein to refer to those persons or entities that provide transaction account(s) to account holders. For example, an issuer may be a credit card issuer, a bank, or any other financial institution.

In general, transaction accounts can be used for transactions between the user and merchant through any suitable online or offline communication network, such as, for example, a wired network, a wireless network, a telephone network, an intranet, the global, public Internet, and/or the like. Additionally, the user can complete transactions with the merchant using any suitable communication device, such as a point-of-interaction device (e.g., a point-of-sale (POS) device, a personal digital assistant (PDA), a mobile telephone, a kiosk, etc.), a radio frequency enabled transaction card, and/or the like.

A financial transaction instrument (also referred to as a "payment device") can be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid or stored-value cards, or any other like financial transaction instrument. A financial transaction instrument can also have electronic functionality provided by a network of electronic circuitry that is printed or otherwise incorporated onto or within the transaction instrument (and typically referred to as a "smart card"), or be a fob having a transponder and an RFID reader.

The term "safeguard," "security measure," "security safeguard," "protection method," and/or the plural forms of these terms are used interchangeably throughout herein to refer to any process, hardware, software, algorithm, countermeasure, or the like, that increases security, confidentiality, and/or integrity of data communicated over communication networks. For example, a safeguard can be a key length, an encryption/decryption algorithm, a checksum, a hash function, an access level, a password requirement, a fingerprint requirement, or the like.

The term "security-related information" is used herein to refer to any data or information that can be used by a trust mediator (described below) as the basis for making decisions as to implementations of security policy. For example, security-related information can include data relating to threats, exploits, attacks, safeguards, security measures, security safeguards, protection methods, financial transaction-related data, non-financial-transaction-related data, mobile phone usage data, and the like.

FIG. 1 is a diagram of an exemplary security system 100 for adaptively securing mobile communication device transactions in accordance with an embodiment of the present invention. As shown in FIG. 1, security system 100 includes both internal network components 118 and external network components 120. Internal network components 118 are network components that are internal to an issuer network. External network components 120 are network components that are external to the issuer network.

External network components 120 include an external terminal 102, which is any electronic communication device a consumer can use as an interface to complete a financial transaction with a merchant. Examples of types of financial transactions a user 122 may request include a purchase at a point-of-sale (POS) device, a transfer of funds from an account of user 122 to that of another user, a mobile-to-mobile fund transfer, a transfer of funds between two accounts commonly owned by user 122, a request for data stored in one of internal network components 118 in association with an account of user 122, a request to modify data stored in one of internal network components 118 in association with an account of user 122, etc. For example, external terminal 102 can be a point-of-sale (POS) device, a kiosk, or a mobile communication device such as a mobile telephone, a personal computer, a POS device, a personal digital assistant (PDA), a portable computing device, a radio frequency enabled transaction card, or the like.

Another external network component 120 is a visiting network 110, which is any electronic communication network that is communicatively coupled to external terminal 102 and one or more internal network components 118. Example visiting networks 110 include a mobile telephone carrier network, an external payment network and/or service, a media network, a Rich Site Summary (RSS) feed network, a private network, a public network, a Bluetooth™ network, an automated clearing house (ACH) network, a peer-to-peer (P2P) network, or the like.

Internal network components 118 include a gateway 112, which is communicatively coupled to visiting network 110. External terminal 102 communicates with internal network components 118 through visiting network 110. Gateway 112 translates communication network protocols to enable proper communication between visiting network 110 and internal network components 118. Gateway 112 also includes any number of communication network modules depending on the characteristics of visiting network 110 and internal network components 118. For instance, gateway 112 can include a firewall, a network address resolution table, a proxy for address translation, a session border controller, etc. (all not shown).

Another internal network component 118 is a security services module 114. Security services module 114 is communicatively coupled to gateway 112, and performs security functions such as encryption, decryption, key management, and/or any other functions suitable for ensuring the security, confidentiality, and/or integrity of data communicated throughout system 100.

Another internal network component 118 is home value module 106, which includes a memory or other electronic storage device (not shown) that electronically stores information related to electronic assets owned by the issuer. For example, home value 106 can store data entries representing credit, deposits, loyalty points, reward points, media, and the like. Each data entry of home value 106 has a value-base and an associated quantitative and/or qualitative value that also are stored in the memory (not shown) and are used by trust mediator 116 in order to assess security risks associated with that particular data entry.

Internal network components 118 also include a value mediator 104, which valuates electronic assets owned by an entity other than the issuer. These assets have a value-base other than the value-bases stored in home value 106. Value mediator 104 thus enables quantification and exchange of value across different value-bases. In addition, by valuating these assets, value mediator 104 enables risk magnitude quantification associated with these assets to be computed by trust mediator 116. For example, if the value of the transaction or commerce was an asset calculated by value mediator 104, then this computed value is input to trust mediator 116 to react by changing one or more protections, countermeasures, or policies related to the asset.

Trust mediator (TM) agents 108a-108f (collectively 108) are deployed on external terminal 102, visiting network 110, gateway 112, security services module 114, value mediator 104, and home value module 106, respectively. TM agents 108 detect and assess security-related information collected from one or more sensors corresponding to each respective network component and communicate this information to trust mediator 116. The sensors measure a physical quantity, such as an electronic signal or other data, and convert it into a signal which can be read by an observer and/or by an instrument, such as one or more of the TM agents 108 or trust mediator 116. Trust mediator 116, in turn, communicates instructions to one or more of the TM agents 108 to modify implementation of security safeguards. Trust mediator 116 also assesses information received from the TM agents 108 and determines whether and/or how to modify security safeguards according to security and/or trust mediation algorithms that can be singular or a summation of plural safeguards and countermeasures interchangeable based on security goals.

An exemplary external terminal 102, as well as exemplary processes for adapting security measures of a communication network based on dynamic feedback, collecting data from sensors, and reporting the data to a trust mediator are disclosed in U.S. patent application Ser. No. 12/640,183, entitled "Systems, Methods, and Computer Program Products for Collecting and Reporting Sensor Data in a Communication Network," filed Dec. 17, 2009, which is hereby incorporated by reference in its entirety.

Figure 2:
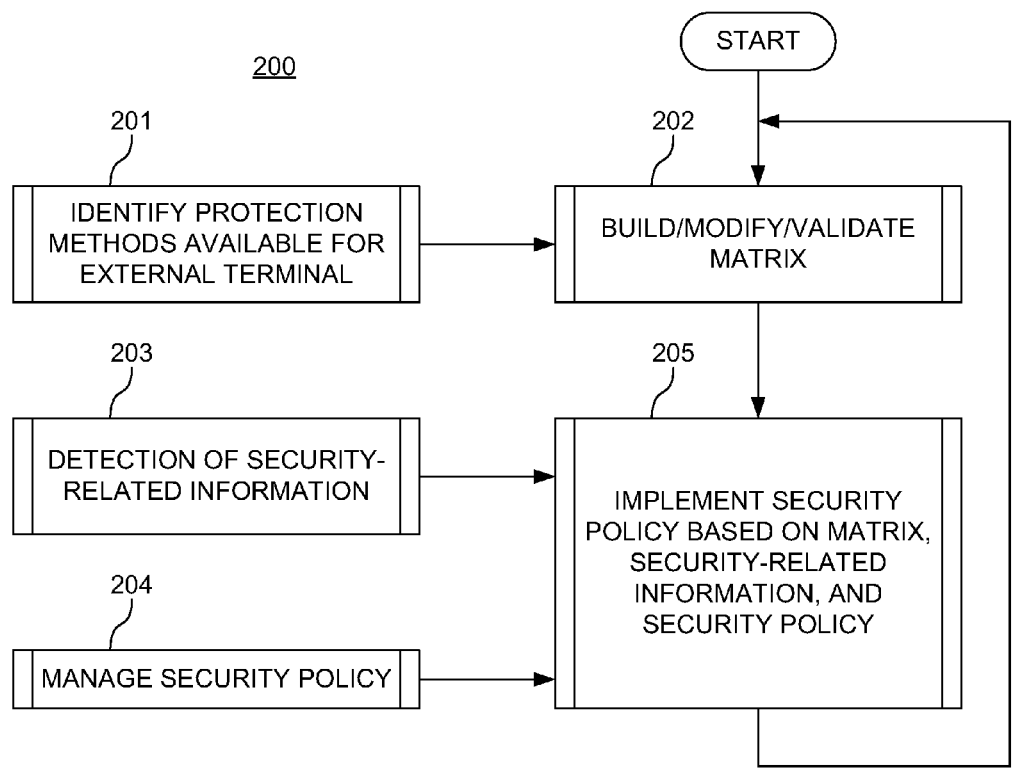
FIG. 2 is a flowchart illustrating an exemplary process for implementing dynamically reacting policies and protections to secure mobile financial transactions.

FIG. 2 is a flowchart illustrating an exemplary process 200 for implementing dynamically reacting policies and protections to secure mobile financial transactions. At block 201, trust mediator 116 collects the protection methods that are available for external terminal 102. In particular, a list of the protection methods that are available to be implemented by external terminal 102 is transmitted to trust mediator 116 by TM agent 108a over a communication channel, such as the external and/or internal networks 120 and 118. An exemplary process for collecting the protection methods that are available for external terminal 102 is discussed in further detail below with respect to FIG. 3.

At block 202, trust mediator 116 builds, modifies, and/or validates a matrix of protection methods available for external terminal 102. The matrix is built based on the list of protection methods received from TM agent 108a for external terminal 102, as well as protection method information that is stored in a policy server (not shown). An exemplary process for building, modifying, and/or validating the matrix of protection methods available for external terminal 102 is discussed in further detail below with respect to FIG. 4.

Block 203 represents a process for detecting security-related information that is periodically reported to trust mediator 116 by one or more of TM agents 108a-108f. Exemplary processes for detecting security-related information are discussed in further detail in U.S. patent application Ser. No. 12/640,183, entitled "Systems, Methods, and Computer Program Products for Collecting and Reporting Sensor Data in a Communication Network," filed Dec. 17, 2009.

Block 204 represents a process for managing a security policy by authorized users of system 100. In general, the security policy is managed by maintaining up-to-date lists of protection methods, detected security-related information, and policy rules in the policy server for individual external terminals 102, as well as maintaining master lists of the same, and then implementing the rules based on the maintained lists. An exemplary process for managing a security policy is discussed in further detail below with respect to FIG. 5.

At block 205, trust mediator 116 implements a security policy based on the protection methods stored in the matrix built at block 202, the security-related information detected at block 203, and the security policy managed in the policy server at block 204. In general, the security policy is implemented by selecting one or more protection methods from the matrix corresponding to external terminal 102. Which protection method(s) are utilized depends on the security-related information detected at block 203 and the rules that define the security policy managed at block 204. An exemplary process for implementing a security policy is discussed in further detail below with respect to FIG. 6.

Figure 3:
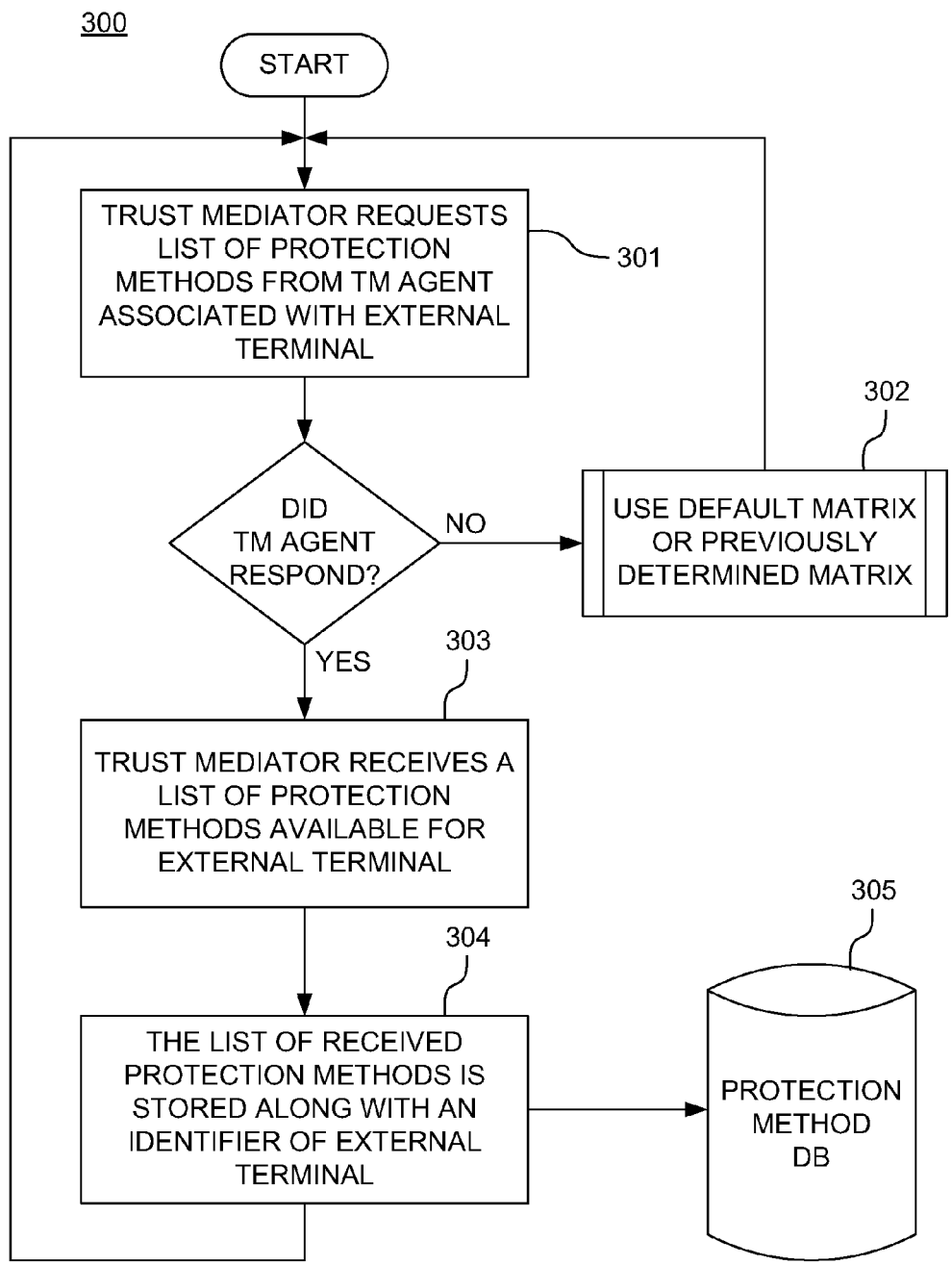
FIG. 3 is a flowchart illustrating an exemplary process for collecting protection methods available for an external terminal.

FIG. 3 is a flowchart illustrating an exemplary process 300 for collecting protection methods available for external terminal 102. At block 301, trust mediator 116 requests from TM agent 108a the list of protection methods available for external terminal 102. Alternatively, TM agent 108a can transmit the list of protection methods available for external terminal 102 to trust mediator 116 upon connecting to internal network 118, without being prompted by trust mediator 116. The list of protection methods includes each protection method available for external terminal 102 and can be in a tabular format or any other suitable format. Examples of protection methods include encryption methods, identification methods, authentication methods, pairing methods, digital signature methods, nonrepudiation methods, steganographic methods, and the like. Protection methods can also include lower-level methods such as specific implementation details. For instance, the protection methods may include a specific encryption algorithm, and/or specific capabilities relating to the encryption algorithm, such as key lengths, key exchange methods, key building methods, etc. By identifying specific protection methods capable of being implemented by external terminal 102, trust mediator 116 enforces a dynamic security policy that is tailored to the particular security capabilities of individual external terminals 102.

At block 302, if TM agent 108a does not respond to a request from the trust mediator 116 for the list of protection methods after a predetermined time period then trust mediator 116 uses a predetermined default matrix of protection methods. The default protection methods can include protection methods that are common to a large majority of external terminals 102. Alternatively, if TM agent 108a does not respond to the request after a predetermined time period then trust mediator 116 can use a matrix previously configured for a type of external terminal most similar to external terminal 102, such as a mobile phone having the same manufacturer and/or model type as external terminal 102. Trust mediator 116 then repeats its request for protection methods from TM agent 108a so as to maintain an up-to-date list of the protection methods available for implementation by external terminal 102.

At block 303, if TM agent 108a responds to the request within the predetermined time period then trust mediator 116 receives the list of protection methods available for external terminal 102. As those skilled in the art will recognize, the list could be stored and/or transmitted in a tabular format or any other suitable format.

At block 304, trust mediator 116 stores, in a database 305, the received list of protection methods available for external terminal 102 along with an external terminal identifier corresponding to external terminal 102. In this way, lists of protection methods are maintained for individual external terminals 102 for future communications with internal network 118.

Figure 4:
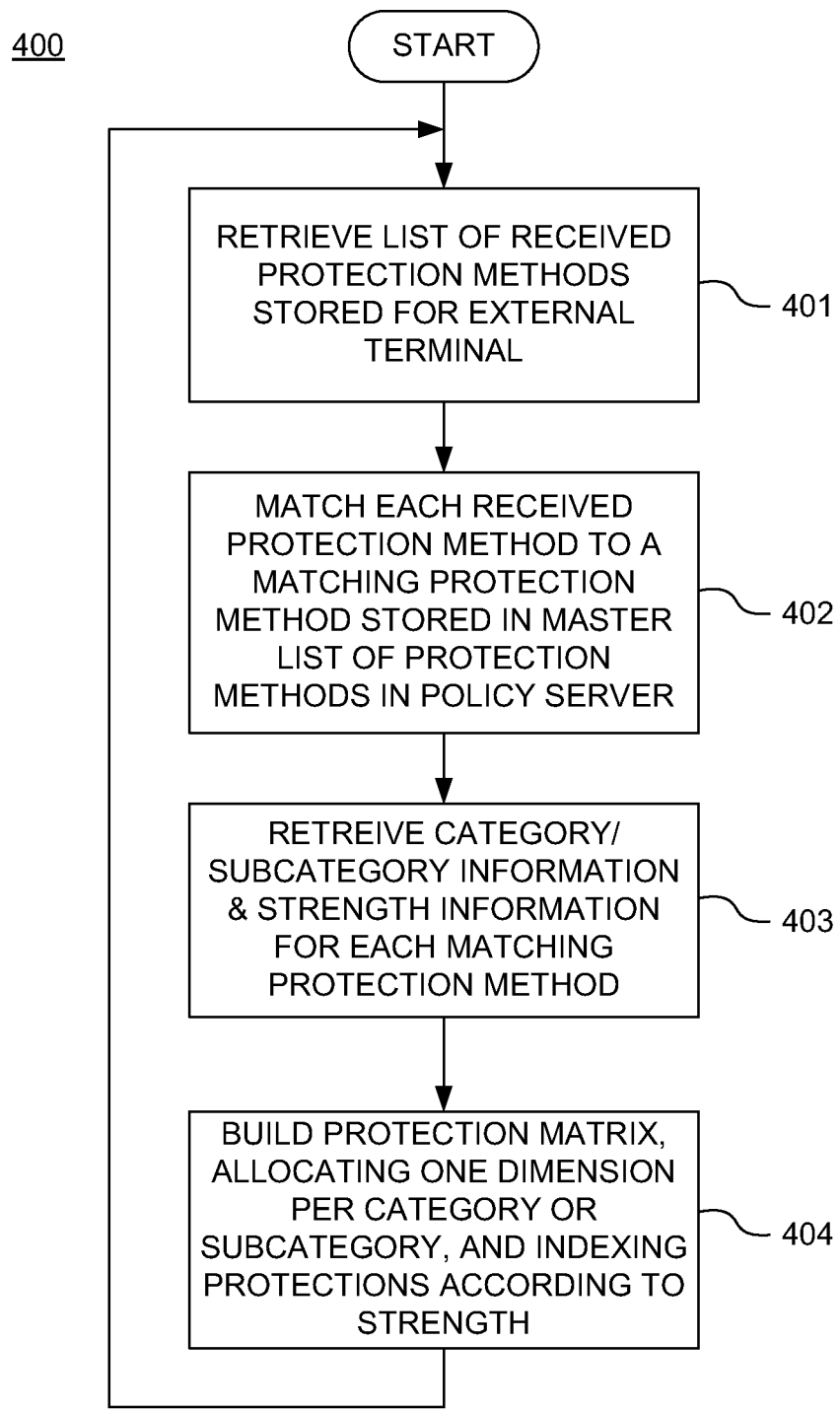
FIG. 4 is a flowchart diagram illustrating an exemplary process for building a matrix of protection methods for an external terminal.

FIG. 4 is a flowchart diagram illustrating an exemplary process 400 for building a matrix of protection methods for external terminal 102. At block 401, trust mediator 116 performs a look-up in database 305 using the external terminal identifier corresponding to external terminal 102, and retrieves the corresponding list of protection methods stored in the database.

At block 402, trust mediator 116 matches each protection method on the retrieved list of protection methods to a matching protection method stored in a master list of protection methods in the policy server. If trust mediator 116 is unable to match a particular one of the received protection methods to a protection method in the master list, then trust mediator 116 adds the protection method to the master lists, as described in further detail with respect to FIG. 5.

In one embodiment, the master list of protection methods is distinct from individual lists of protection methods. Individual lists of protection methods are lists that include protection methods corresponding to an individual external terminal 102, whereas the master list of protection methods includes all protection methods known by trust mediator 116. The master list of protection methods also includes, for each protection method, category information, subcategory information, strength information, and/or other pertinent information corresponding to the particular protection method, which are discussed in further detail below.

At block 403, trust mediator 116 retrieves the category information, subcategory information, strength information, and/or other information corresponding to each matching protection method from the database 305. This information is used by trust mediator 116 to build the matrix of protection methods for external terminal 102.

At block 404, trust mediator 116 builds a matrix of protection methods corresponding to external terminal 102. The matrix is built based on the list of protection methods retrieved at block 401 that correspond to external terminal 102, and the category information, subcategory information, strength information, and/or other information retrieved at block 403 that correspond to each of the protection methods. In particular, trust mediator 116 allocates one dimension of the matrix per category or subcategory. In this way, the constructed matrix has multiple layers or dimensions.

For example, a top layer or first dimension of the matrix could include entries for general types of encryption, such as transport level encryption, payload level encryption, transaction level encryption, and encryption of data at rest. Each entry also has associated with it a second layer or dimension of the matrix including different security algorithms such as Secure Sockets Layer (SSL) and Transport Layer Security (TLS) for transport layer encryption, etc. As those skilled in the art will recognize, other security algorithms can be used and still be within the scope of the present invention.

Each entry also can have associated with it a third layer or dimension, which includes implementation options for each of the algorithms of the second layer, such as key lengths, methods for building keys, types of key exchange methods, etc. In this way, the matrix is multidimensional, enabling many protection method options to be selected based on the capabilities of individual external terminals 102.

Trust mediator 116 indexes the protection methods within the matrix according to their corresponding strength, for example, in an order of increasing strength. This enables trust mediator 116 to increase the strength of the protection method chosen by simply increasing the index of the protection method used.

After block 404, trust mediator 116 retrieves another list of protection methods stored in the database 305 for external terminal 102. Trust mediator 116 compares the newly retrieved list to the previously retrieved list to validate the matrix of protection methods. If there are any new protection methods the matrix is updated accordingly. In this way, an up-to-date matrix of protection methods is maintained for external terminal 102.

Figure 5:
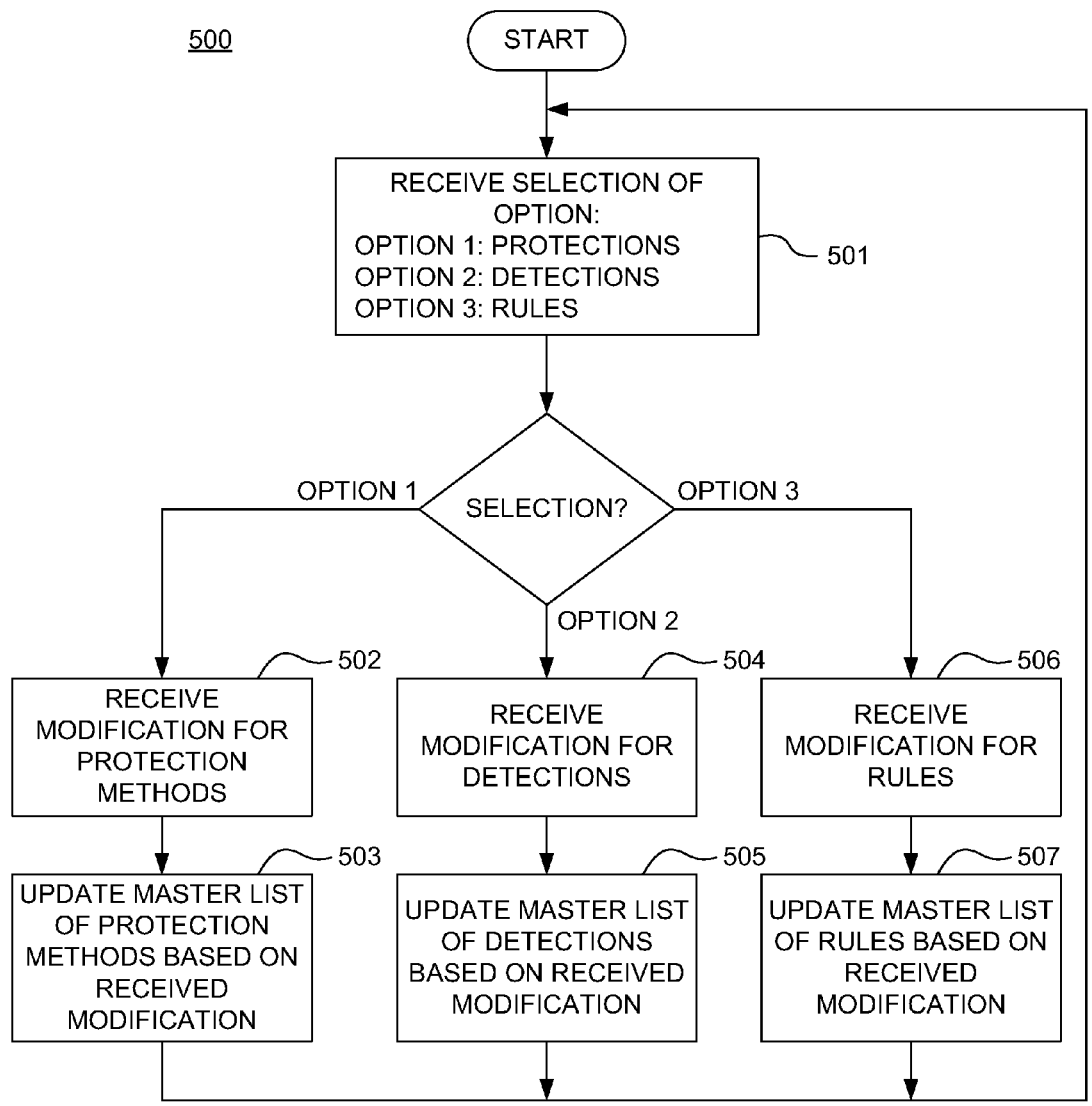
FIG. 5 is a flowchart diagram illustrating an exemplary process for managing a security policy.

FIG. 5 is a flowchart diagram illustrating an exemplary process 500 for managing a security policy. At block 501, a selection from among three options is received by trust mediator 116 via a user interface (not shown). The user interface may be a computer or workstation in communication with internal network 118, or any other suitable user interface. The three options correspond to aspects of the security system to be modified. Option 1 corresponds to the modification of protections, option 2 corresponds to the modification of detections, and option 3 corresponds to the modification of rules. Modifications, in this context, means adding, deleting, and/or modifying data in any fashion.

If option 1 is selected, at block 502, one or more protection method modifications are received by trust mediator 116 via the user interface. These modifications could be made in response to new security-related information detected at block 203. For instance, if it is discovered that a certain protection method, e.g., an encryption algorithm, has been compromised or has a design flaw, then that protection method is invalidated in the master list of protection methods. In this way, when an external terminal 102 communicates with internal network 118, trust mediator 116 instructs the external terminal 102 not to use the invalidated protection method, but instead to use an alternative protection method. As those skilled in the art will recognize, other modifications to protection methods are possible, such as limiting the implementation of a certain encryption algorithm to a 256-bit key. In this way, an up-to-date master list of protection methods is maintained, enabling trust mediator 116 to implement a dynamic security policy as new security-related information is detected. At block 503, the master list of protection methods is updated based on the received protection method modification(s).

If option 2 is selected, at block 504, one or more modifications to a master list of detections are received. In one embodiment, this master list of detections is distinct from the detections received at block 203. The master list of detections is maintained to give trust mediator 116 points of comparison for the detections received at block 203. This enables trust mediator 116 to properly identify, and to apply rules based on, detected security-related information. The modifications to the master list of detections may also be made in response to new security-related information detected at block 203. For instance, if a new detection, such as a never-before-seen attack on a particular protection methods is detected, that detection may not be included in the master list of detections. Trust mediator 116 then, upon discovering the new detection, adds it to the master list of detections, and flags it for later analysis and characterization by a security professional. Once the detection is analyzed and characterized, it is included in the master list and can have corresponding rules created for it. At block 505, the master list of detections is updated based on the received detection modification(s).

If option 3 is selected, at block 506, one or more modifications are received for a master list of rules. The master list of rules includes the dynamic security policy implemented by trust mediator 116. The modifications could be made, e.g., in response to new security-related information detected at block 203. In general, the rules dictate which specific protection methods to select from the matrix of protection methods for implementation in the event that certain security-related information is detected at block 203.

For example, based on receiving a certain type of detection signal (e.g., a communication from a TM agent), a rule may dictate that trust mediator 116 selects (1) a protection method randomly, (2) a protection method linearly (selecting a protection method of increased or decreased strength by increasing or decreasing the index of the matrix of protection methods by one or more steps), or (3) any alternative protection method within a certain category because the currently implemented method in that category has been invalidated, etc. In this way, if one protection method becomes vulnerable, trust mediator 116 can implement the dynamic security policy to select another protection method. Another rule may involve comparing a particular security-related detection score to a predetermined threshold, and selecting different protection methods based on the results of the comparison. The threshold can be modified via the user interface (not shown) at block 506 as well. Alternatively, the threshold can be modified in response to receiving certain security-related information at block 203. At block 507, the master list of rules is updated based on the received rule modification(s).

Figure 6:
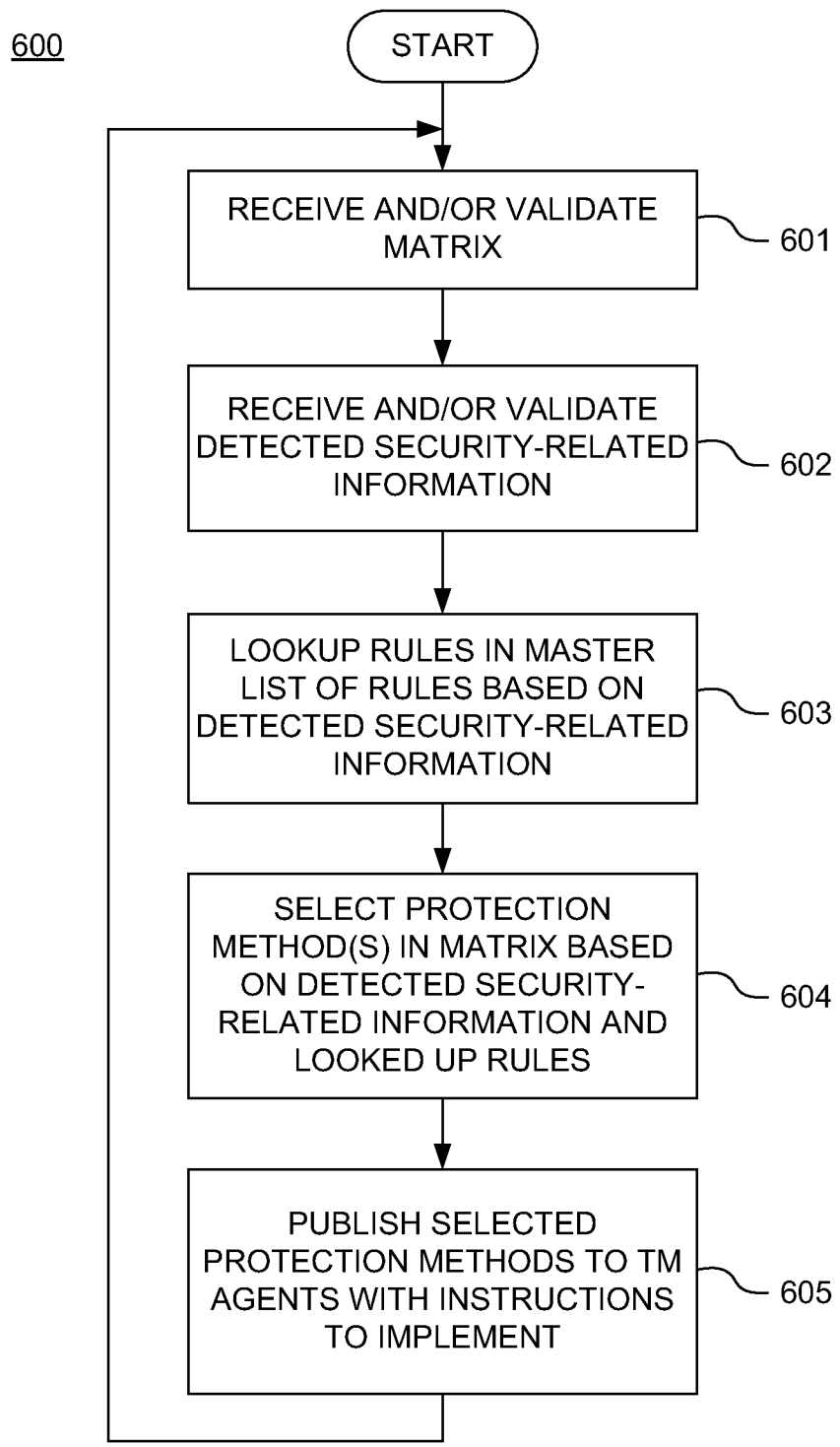
FIG. 6 is a flowchart diagram illustrating an exemplary process for implementing a security policy based on a matrix of protection methods, security-related information, and a security policy.

FIG. 6 is a flowchart diagram illustrating an exemplary process 600 for implementing a security policy based on a matrix of protection methods, security-related information, and a security policy. At block 601, the matrix of protection methods established at block 202 for external terminal 102 is retrieved and/or validated from the database (not shown)

by trust mediator 116. If the matrix of protection methods has not yet been retrieved for a first time, then trust mediator 116 retrieves it. If, however, the matrix of protection methods has been retrieved at least once, then trust mediator 116 simply validates the previously retrieved matrix, by using a time stamp to confirm that the matrix of protection methods is up-to-date, i.e., that it has not changed since the last retrieval.

At block 602, the security-related information detected at block 203 is retrieved, and/or validated. If the security-related information has not yet been retrieved for a first time, then trust mediator 116 retrieves it. If, however, the security-related information has been retrieved at least once, then trust mediator 116 simply validates the previously received security-related information, by using a time stamp to confirm that the security-related information is up-to-date, i.e., that it has not changed since the last retrieval.

At block 603, trust mediator 116 performs a look-up of the rules in the master list of rules established at block 507 based on the security-related information retrieved at block 602. In particular, trust mediator 116 retrieves all the rules in the master list of rules that correspond to each security-related information detection.

At block 604, one or more protection methods are selected from the matrix of protection methods that has been established for external terminal 102 based on the security-related information retrieved at block 602 and the rules looked up at block 603. At block 605, the one or more protection methods selected at block 604 are published to one or more of TM agents 108*a*-108*f* instructing them to be employed as necessary to implement the dynamic security policy.

If, at block 604, more than one protection method is selected for implementation by trust mediator 116, then the total protection includes a sum of the multiple selected protection methods. In other words, the protection is not one-dimensional, but instead is multi-dimensional. That is, multiple layers or dimensions of protection are provided, which further reduces risk exposure.

In one embodiment, each particular multi-dimensional combination of protection methods selected at block 604 represents a specific protection signature. Similarly, each particular multi-dimensional combination of security-related information (e.g., threats, exploits, attacks, etc.) detected by sensors and/or TM agents 108*a*-108*f* at block 203 represents a specific attack signature. Rules are defined at block 506 matching specific protection signatures to specific attack signatures. In this way, when the detected attack signature changes, trust mediator 116 changes the protection signature to react accordingly. Thus, multi-dimensional protection is provided as a response to multi-dimensional attacks.

In another embodiment, the rules defined at block 506 do not simply authorize or deny a transaction solely in response to detecting any particular one-dimensional security threat. Instead, the rules involve a summation of the current multi-dimensional protection and attack signatures, and a balance of the risk of loss against opportunity cost. In particular, trust mediator 116 computes a risk of loss associated with permitting a transaction to continue, based on the summation of the current multi-dimensional protection and attack signatures. Trust mediator 116 then computes an opportunity cost associated with denying the transaction, based on the current value of exposure (e.g., the transaction amount).

The risk of loss is balanced against the opportunity cost using a table of rules. The table of rules defines, for each value of exposure, a threshold of a maximally permissible risk of loss. In response to a change in attack signature, trust mediator 116 can dynamically change the protection signature (e.g., by using a stronger combination of protection methods), but is limited to selecting a protection signature that results in a risk of loss within the maximally permissible risk of loss for the current value of exposure. If, for the current attack signature and value of exposure, no protection signature exists in the protection matrix that can keep the risk of loss within the maximally permissible risk of loss, then trust mediator 116 may deny the transaction. The risk of loss is thus balanced against the opportunity cost so as to minimize exposure to risk while also minimizing interruptions to commerce.

In one respect, denying a legitimate $10 transaction may be considered the same loss of value as a theft of $10. By implementing the balancing rules, not only are losses due to theft minimized, but losses due to denials of legitimate transactions also are minimized.

Trust mediator 116 can also include time as a factor in computing the risk of loss and the opportunity cost. For instance, in computing the risk of loss, trust mediator 116 computes a period of time during which the current protection signature will remain effective against the current attack signature.

In addition, rather than enforcing the thresholds of maximally permissible risks of loss for each individual transaction, the thresholds can be enforced for averages of multiple transactions completed over time. For instance, trust mediator 116 can compute a running average of the risks of loss for multiple transactions. If multiple transactions having a risk of loss appreciably lower than the maximally permissible risk of loss are accumulated, then trust mediator 116 may permit a transaction having a risk of loss higher than the maximally permissible risk of loss, so long as the running average of the risk of loss does not exceed the maximally permissible risk of loss. In this way, an acceptable average risk of loss is maintained, while permitting the completion of transactions that may have otherwise been deemed too risky.

The present invention (e.g., system 100, processes 200-600, or any part(s) or function(s) thereof) can be implemented using hardware, software or a combination thereof and can be implemented in one or more computer systems or other processing systems. However, the manipulations performed by the present invention were often referred to in terms, such as adding or comparing, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers or similar devices.

Figure 7:
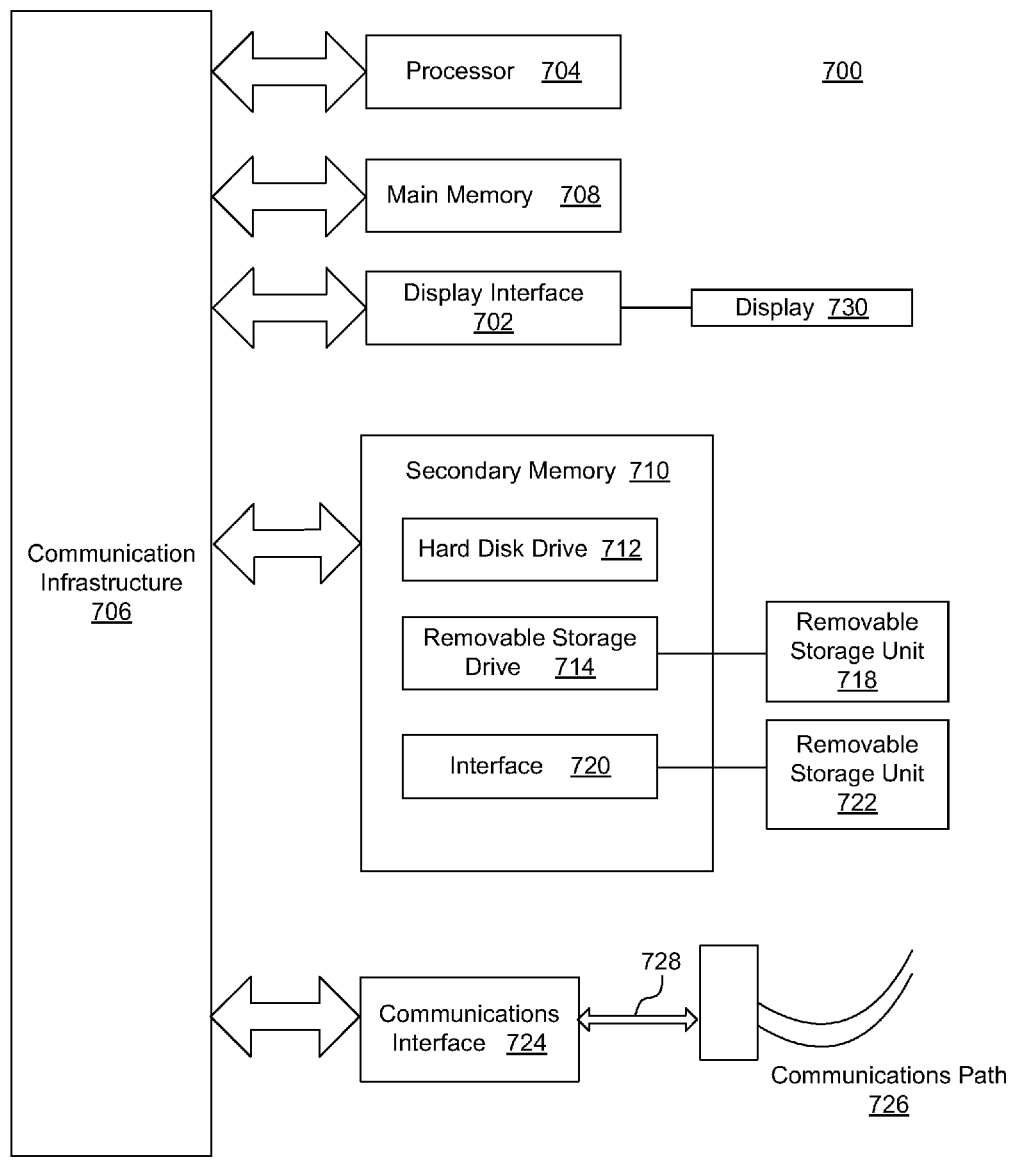
FIG. 7 is a block diagram of an exemplary computer system useful for implementing the present invention.

In fact, in one embodiment, the invention is directed toward one or more computer systems capable of carrying out the functionality described herein. An example of a computer system 700 is shown in FIG. 7.

Computer system 700 includes one or more processors, such as processor 704. The processor 704 is connected to a communication infrastructure 706 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 700 can include a display interface 702 that forwards graphics, text, and other data from the communication infrastructure 706 (or from a frame buffer not shown) for display on the display unit 730.

Computer system 700 also includes a main memory 708, preferably random access memory (RAM), and can also include a secondary memory 710. The secondary memory 710 can include, for example, a hard disk drive 712 and/or a removable storage drive 714, representing a floppy disk drive, a magnetic tape drive, an optical disk drive, etc. The removable storage drive 714 reads from and/or writes to a removable storage unit 718 in a well known manner. Removable storage unit 718 represents a floppy disk, magnetic tape, optical disk, etc. which is read by and written to by removable storage drive 714. As will be appreciated, the removable storage unit 718 includes a computer usable storage medium having stored therein computer software and/or data.

In alternative embodiments, secondary memory 710 can include other similar devices for allowing computer programs or other instructions to be loaded into computer system 700. Such devices can include, for example, a removable storage unit 722 and an interface 720. Examples of such can include a program cartridge and cartridge interface (such as that found in video game devices), a removable memory chip (such as an erasable programmable read only memory (EPROM), or programmable read only memory (PROM)) and associated socket, and other removable storage units 722 and interfaces 720, which allow software and data to be transferred from the removable storage unit 722 to computer system 700.

Computer system 700 can also include a communications interface 724. Communications interface 724 allows software and data to be transferred between computer system 700 and external devices. Examples of communications interface 724 can include a modem, a network interface (such as an Ethernet card), a communications port, a Personal Computer Memory Card International Association (PCMCIA) slot and card, etc. Software and data transferred via communications interface 724 are in the form of signals 728 which can be electronic, electromagnetic, optical or other signals capable of being received by communications interface 724. These signals 728 are provided to communications interface 724 via a communications path (e.g., channel) 726. This channel 726 carries signals 728 and can be implemented using wire or cable, fiber optics, a telephone line, a cellular link, a radio frequency (RF) link and other communications channels.

In this document, the terms "computer program medium," "computer-readable medium," and "computer-usable medium" are used to generally refer to media such as removable storage drive 714, a hard disk installed in hard disk drive 712, and/or signals 728. These computer program products provide software to computer system 700. The invention is directed to such computer program products.

Computer programs (also referred to as computer control logic) are stored in main memory 708 and/or secondary memory 710. Computer programs can also be received via communications interface 724. Such computer programs, when executed, enable the computer system 700 to perform the features of the present invention, as discussed herein. In particular, the computer programs, when executed, enable the processor 704 to perform the features of the present invention. Accordingly, such computer programs represent controllers of the computer system 700.

In an embodiment where the invention is implemented using software, the software can be stored in a computer program product and loaded into computer system 700 using removable storage drive 714, hard drive 712 or communications interface 724. The control logic (software), when executed by the processor 704, causes the processor 704 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures illustrated in the attachments, which highlight the functionality and advantages of the present invention, are presented for example purposes only. The architecture of the present invention is sufficiently flexible and configurable, such that it can be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

What is claimed is:

1. A computer implemented method comprising:
receiving, by a trust mediator included in an issuer network and having a processor, a list of protection methods from a first external terminal over a communication network, wherein the list of protection methods includes protection methods available to the first external terminal;
matching, by the trust mediator, each of the protection methods in the received list of protection methods to a corresponding protection method in a master list of protection methods stored in a protection method database, wherein the master list of protection methods includes category information and strength information corresponding to each protection method;
creating, by the trust mediator, a matrix of protection methods based on at least one of the matched protection methods, the matrix including a plurality of dimensions corresponding to a plurality of categories, respectively, wherein the protection methods are arranged in the matrix based on the category information, and, within each dimension, the protection methods are arranged based on the strength information;
assigning, by the trust mediator, a first index level to a first protection method in the matrix, and a second index level to a second protection method in the matrix;

receiving, by the trust mediator, security-related information from one or more trust mediator agents over the communication network, wherein the security-related information indicates that the first protection method is invalid;

increasing, by the trust mediator and in response to the receiving the security-related information, a threshold index level;

performing, by the trust mediator, a database lookup using an external terminal identifier for the first external terminal;

retrieving, by the trust mediator and based on the external terminal identifier, rules corresponding to the received security-related information from a master list of rules;

selecting, by the trust mediator, at least one protection method from the matrix of protection methods based on the rules obtained by the retrieving, the category information, the strength information, and the second index level, wherein the second index level is greater than the threshold index level; and transmitting, by the trust mediator, the at least one selected protection method to a trust mediator agent to complete a financial transaction.

2. The method of claim 1, wherein the matrix corresponds to the first external terminal and the at least one selected protection method is transmitted to a trust mediator agent of a second external terminal, the second external terminal having at least one of a same manufacturer and a same model type as the first external terminal.

3. The method of claim 1, further comprising:
modifying, by the trust mediator, at least one of the master list of rules, the master list of protection methods, and a master list of security-related information detections based on the received security-related information.

4. The method of claim 1, wherein the protection methods include at least one of an encryption method, an identification method, an authentication method, a pairing method, a digital signature method, a nonrepudiation method, a steganography method, an encryption method using a specific predetermined key length supported by the first external terminal, an encryption method using a specific predetermined key exchange method supported by the first external terminal, and an encryption method using a key building method.

5. The method of claim 1, wherein the rules include at least one of:
a rule indicating a protection method to select in response to receiving a certain type of the security-related information,
a rule indicating that a protection method of increased strength is to be selected in response to receiving a certain type of the security-related information,
a rule indicating that a protection method is to be selected randomly in response to receiving a certain type of the security-related information, and
a rule indicating that a protection method has been invalidated and is not to be used.

6. A system comprising:
a trust mediator including a processor coupled to a memory, operable to:
receive a list of protection methods from a first external terminal over a communication network, wherein the list of protection methods includes protection methods available to the first external terminal;
match each of the protection methods in the received list of protection methods to a corresponding protection method in a master list of protection methods stored in a protection method database, wherein the master list of protection methods includes category information and strength information corresponding to each protection method;

create a matrix of protection methods based on at least one of the matched protection methods, the matrix including a plurality of dimensions corresponding to a plurality of categories, respectively, wherein the protection methods are arranged in the matrix based on the category information, and, within each dimension, the protection methods are arranged based on the strength information;

assign a first index level to a first protection method in the matrix, and a second index level to a second protection method in the matrix;

receive security-related information from one or more trust mediator agents over the communication network, wherein the security-related information indicates that the first protection method is invalid;

increase, in response to the receiving the security-related information, a threshold index level;

perform a database lookup using an external terminal identifier for the first external terminal;

retrieve, based on the external terminal identifier and from a master list of rules stored in the memory, rules corresponding to the received security-related information;

select at least one protection method from the matrix of protection methods based on the rules obtained by the retrieving, the category information, the strength information, and the second index level, wherein the second index level is greater than the threshold index level; and transmit the at least one selected protection method to a trust mediator agent to complete a financial transaction.

7. The system of claim 6, wherein the matrix corresponds to the first external terminal and the at least one selected protection method is transmitted to a trust mediator agent of a second external terminal, the second external terminal having at least one of a same manufacturer and a same model type as the first external terminal.

8. The system of claim 6, wherein the trust mediator is further operable to:
modify at least one of the master list of rules, the master list of protection methods, and a master list of security-related information detections based on the received security-related information.

9. The system of claim 6, wherein the protection methods include at least one of an encryption method, an identification method, an authentication method, a pairing method, a digital signature method, a nonrepudiation method, a steganography method, an encryption method using a specific predetermined key length supported by the first external terminal, an encryption method using a specific predetermined key exchange method supported by the first external terminal, and an encryption method using a key building method.

10. The system of claim 6, wherein the rules include at least one of:
a rule indicating a protection method to select in response to receiving a certain type of the security-related information,
a rule indicating that a protection method of increased strength is to be selected in response to receiving a certain type of the security-related information, a rule indicating that a protection method is to be selected randomly in response to receiving a certain type of the security-related information, and a rule indicating that a protection method has been invalidated and is not to be used.

11. A non-transitory computer-readable medium having stored thereon sequences of instructions, the sequences of instructions including instructions, which, when executed by a computer system, cause the computer system to:

receive, by a trust mediator included in an issuer network and having a processor, a list of protection methods from a first external terminal over a communication network, wherein the list of protection methods includes protection methods available to the first external terminal;

match, by the trust mediator, each of the protection methods in the received list of protection methods to a corresponding protection method in a master list of protection methods stored in a protection method database, wherein the master list of protection methods includes category information and strength information corresponding to each protection method;

create, by the trust mediator, a matrix of protection methods based on at least one of the matched protection methods, the matrix including a plurality of dimensions corresponding to a plurality of categories, respectively, wherein the protection methods are arranged in the matrix based on the category information, and, within each dimension, the protection methods are arranged based on the strength information;

assign, by the trust mediator, a first index level to a first protection method in the matrix, and a second index level to a second protection method in the matrix;

receive, by the trust mediator, security-related information comprising an external terminal identifier for the first external terminal from one or more trust mediator agents over the communication network, wherein the security-related information indicates that the first protection method is invalid;

increase, by the trust mediator and in response to the receiving the security-related information, a threshold index level;

perform, by the trust mediator, a database lookup using the external terminal identifier;

retrieve, by the trust mediator and based on the external terminal identifier, rules corresponding to the received security-related information from a master list of rules;

select, by the trust mediator, at least one protection method from the matrix of protection methods based on the rules obtained by the retrieving, the category information, the strength information, and the second index level, wherein the second index level is greater than the threshold index level; and transmit, by the trust mediator, the at least one selected protection method to a trust mediator agent to complete a financial transaction.

12. The non-transitory computer-readable medium of claim 11, wherein the matrix corresponds to the first external terminal and the at least one selected protection method is transmitted to a trust mediator agent of a second external terminal, the second external terminal having at least one of a same manufacturer and a same model type as the first external terminal.

13. The non-transitory computer-readable medium of claim 11, wherein the sequences of instructions further include instructions, which, when executed by the computer system, cause the computer system to:

modify, by the trust mediator, at least one of the master list of rules, the master list of protection methods, and a master list of security-related information detections based on the received security-related information.

14. The non-transitory computer-readable medium of claim 11, wherein the protection methods include at least one of an encryption method, an identification method, an authentication method, a pairing method, a digital signature method, a nonrepudiation method, a steganography method, an encryption method using a predetermined specific key length supported by the first external terminal, an encryption method using a predetermined specific key exchange method supported by the first external terminal, and an encryption method using a key building method.

15. The non-transitory computer-readable medium of claim 11, wherein the rules include at least one of:

a rule indicating a protection method to select in response to receiving a certain type of the security-related information, a rule indicating that a protection method of increased strength is to be selected in response to receiving a certain type of the security-related information, a rule indicating that a protection method is to be selected randomly in response to receiving a certain type of the security-related information, and a rule indicating that a protection method has been invalidated and is not to be used.

16. A method comprising:

transmitting, by an external terminal including a processor, security-related information comprising an external terminal identifier for the external terminal to a trust mediator over a communication network, the security-related information including sensor data received from a plurality of sensors, the trust mediator being included in an issuer network, wherein the security-related information indicates that a first protection method is invalid;

wherein the trust mediator performs a database lookup using the external terminal identifier;

wherein the trust mediator retrieves, based on the external terminal identifier, rules corresponding to the received security-related information from a master list of rules stored in a protection method database;

receiving, by the external terminal and in response to the transmitting of the security-related information, at least one protection method from the trust mediator for implementation, the at least one protection method being selected from a matrix of protection methods including the first protection method and a second protection method, the matrix of protection methods being created based on a list of protection methods available to an external terminal and included in a master list of protection methods, wherein the master list of protection methods includes category information and strength information corresponding to each protection method, the matrix including a plurality of dimensions corresponding to a plurality of categories, respectively, wherein the protection methods are arranged in the matrix based on the category information, and, within each dimension, the protection methods are arranged based on the strength information;

wherein the trust mediator assigns a first index level to the first protection method in the matrix, and a second index level to a second protection method in the matrix;

wherein the trust mediator increases a threshold index level based on the security-related information; and completing, by the external terminal, a financial transaction by using the at least one received protection method.

17. A system comprising:
an external terminal including a processor coupled to a memory, operable to:
  transmit security-related information comprising an external terminal identifier for the external terminal to a trust mediator over a communication network, the security-related information including sensor data received from a plurality of sensors, wherein the security-related information indicates that a first protection method is invalid;
  wherein the trust mediator performs a database lookup using the external terminal identifier;
  wherein the trust mediator retrieves, based on the external terminal identifier, rules corresponding to the received security-related information from a master list of rules stored in a protection method database;
  receive, in response to the transmitting of the security-related information, at least one protection method from the trust mediator, the at least one protection method being selected from a matrix of protection methods including the first protection method and a second protection method, the matrix of protection methods being created based on a list of protection methods available to an external terminal and included in a master list of protection methods, wherein the master list of protection methods includes category information and strength information corresponding to each protection method, the matrix including a plurality of dimensions corresponding to a plurality of categories, respectively, wherein the protection methods are arranged in the matrix based on the category information, and, within each dimension, the protection methods are arranged based on the strength information;
  wherein the trust mediator assigns a first index level to a first protection method in the matrix, and a second index level to a second protection method in the matrix;
  wherein the trust mediator increases a threshold index level based on the security-related information; and
  complete a financial transaction by using the at least one received protection method.

18. A non-transitory computer-readable medium having stored thereon sequences of instructions, the sequences of instructions including instructions, which, when executed by a computer system, cause the computer system to:
  transmit, by an external terminal including a processor, security-related information comprising an external terminal identifier for the external terminal to a trust mediator over a communication network, the security-related information including sensor data received from a plurality of sensors, wherein the security-related information indicates that a first protection method is invalid;
  wherein the trust mediator performs a database lookup using the external terminal identifier;
  wherein the trust mediator retrieves, based on the external terminal identifier, rules corresponding to the received security-related information from a master list of rules stored in a protection method database;
  receiving, by the external terminal and in response to the transmitting of the security-related information, at least one protection method from the trust mediator, the at least one protection method being selected from a matrix of protection methods including the first protection method and a second protection method, the matrix of protection methods being created based on a list of protection methods available to an external terminal and included in a master list of protection methods, wherein the master list of protection methods includes category information and strength information corresponding to each protection method, the matrix including a plurality of dimensions corresponding to a plurality of categories, respectively, wherein the protection methods are arranged in the matrix based on the category information, and, within each dimension, the protection methods are arranged based on the strength information;
  wherein the trust mediator assigns a first index level to a first protection method in the matrix, and a second index level to a second protection method in the matrix;
  wherein the trust mediator increases a threshold index level based on the security-related information; and
  completing, by the external terminal, a financial transaction by using the at least one received protection method.

\* \* \* \* \*